United States Patent [19]
Moffett

[11] Patent Number: 6,132,625
[45] Date of Patent: Oct. 17, 2000

[54] METHOD FOR TREATMENT OF AQUEOUS STREAMS COMPRISING BIOSOLIDS

[75] Inventor: Robert Harvey Moffett, Landenberg, Pa.

[73] Assignee: E. I. du Pont de Nemours and Company, Wilmington, Del.

[21] Appl. No.: 09/315,099

[22] Filed: May 19, 1999

Related U.S. Application Data

[63] Continuation-in-part of application No. 09/086,048, May 28, 1998, abandoned.

[51] Int. Cl.$^7$ .................................................. C02F 1/56
[52] U.S. Cl. ..................... 210/727; 210/725; 210/730; 210/731; 210/734; 210/705; 210/735
[58] Field of Search .................................. 210/710, 725, 210/727, 728, 730, 731, 734, 735, 736, 906

[56] References Cited

U.S. PATENT DOCUMENTS

| | | | |
|---|---|---|---|
| 4,923,629 | 5/1990 | Hasegawa et al. | 252/181 |
| 4,927,498 | 5/1990 | Rushmere | 162/168.3 |
| 4,933,087 | 6/1990 | Markham, Jr. et al. | 210/626 |
| 4,954,220 | 9/1990 | Rushmere | 162/181.6 |
| 5,127,994 | 7/1992 | Johansson | 162/168.3 |
| 5,174,903 | 12/1992 | Miller | 210/725 |
| 5,204,452 | 4/1993 | Dingilian et al. | 530/420 |
| 5,269,939 | 12/1993 | Laurent et al. | 210/705 |
| 5,278,284 | 1/1994 | Lusk et al. | 530/305 |
| 5,393,435 | 2/1995 | Deans et al. | 210/714 |
| 5,413,720 | 5/1995 | Miller | 210/725 |
| 5,433,853 | 7/1995 | Mamone | 210/615 |
| 5,482,693 | 1/1996 | Rushmere et al. | 423/328.1 |
| 5,496,440 | 3/1996 | Carre et al. | 162/168.3 |
| 5,496,572 | 3/1996 | Rudden | 426/74 |
| 5,531,907 | 7/1996 | Williams | 210/727 |
| 5,569,385 | 10/1996 | Laurent et al. | 210/705 |
| 5,597,490 | 1/1997 | Chung et al. | 210/727 |
| 5,620,629 | 4/1997 | Salmen et al. | 252/180 |
| 5,626,721 | 5/1997 | Rushmere et al. | 162/181.6 |
| 5,658,462 | 8/1997 | Hopkins et al. | 210/633 |
| 5,667,697 | 9/1997 | Salmen et al. | 210/727 |
| 5,695,647 | 12/1997 | Carbonell et al. | 210/724 |
| 5,846,384 | 12/1998 | Schö ld et al. | 162/175 |

FOREIGN PATENT DOCUMENTS

| | | |
|---|---|---|
| 0 471 408 A1 | 8/1991 | European Pat. Off. . |
| 0491879 | 6/1994 | European Pat. Off. . |
| 0502089 | 6/1994 | European Pat. Off. . |
| H08-322547 | 12/1996 | Japan . |
| WO 91/07350 | 5/1991 | WIPO . |
| WO 91/07351 | 5/1991 | WIPO . |

OTHER PUBLICATIONS

Tiande Cai et al., Stabilization of Poultry Processing By–Products and Poultry Carcasses Through Direct Chemical Acidification, *Bioresource Technology 52*, 52, pp. 69–77, 1995.

G. D. Najafpour et al., Biological Conversion of Poultry Processing Waste to Single Cell Protein, *Bioresource Technology*, 48, pp. 65–70, 1994.

*Primary Examiner*—Peter A. Hruskoci

[57] ABSTRACT

A process is provided which can be used to clarify substantially aqueous streams and optionally separate biosolids, especially proteins, from food processing operations which comprises contacting an aqueous stream comprising biosolids with an anionic inorganic colloid and an organic polymer, to flocculate the biosolids.

7 Claims, No Drawings

METHOD FOR TREATMENT OF AQUEOUS STREAMS COMPRISING BIOSOLIDS

RELATED U.S. APPLICATION

This application is a continuation-in-part of U.S. patent application Ser. No. 09/086,048, filed May 28, 1998 now abandoned.

BACKGROUND OF THE INVENTION

1. Field of the Invention

This invention relates to a process for clarification of substantially aqueous process streams, and more particularly to separation of biosolids, especially proteins, from food processing operations, such as animal processing, especially poultry processing.

2. Description of the Related Art

Large amounts of biosolids, such as proteins, carbohydrates, fats and oils, are collected in aqueous streams during food processing operations, such as waste and wash waters from the slaughter of animals for food products and other food processing operations such as extraction of proteins during soybean processing, and the like. The aqueous stream must be clarified, i.e., have suspended solids separated and removed to recover valuable product or before being discharged from the processing plant to a municipal or public water system. When separated and dried, the biosolids have value, for example, as animal feed, crop fertilizers, in pharmaceuticals and in personal care products. In one particular example, recovered protein from soybeans may be used in infant formula.

These biosolids are comprised of particles having surface charges. Typically the particles have anionic surface charges at alkaline and neutral pH. The surface charge generates a repulsive force between particles to keep them apart. For individual particles of colloidal size, such as proteins, gravitational forces are insufficient to cause them to settle out of the aqueous suspension. Simple separation methods, such as filtration, are ineffective to separate these protein solids due to blinding of filters or ability of the solids to pass through them. Thus separation and hence, recovery of the protein may be low and/or a waste stream may not be environmentally acceptable for discharge from the processing plant.

Techniques for removal of proteins, carbohydrates, fats and oils, and other biological contaminants from aqueous food processing streams are known. A common practice is to separate the protein, fats and oils from the aqueous stream by flocculation with metal salts, especially iron and/or aluminum salts, and anionic polymers. As it is common to use the recovered proteins, carbohydrates, fats and oils in animal feed, there are health issues when metal salts are used to separate biosolids. There is concern that the recovered biosolids have high levels of metal salts, which may build up in the tissues of the animals to whom the feed is given, these tissues being subsequently consumed by humans. Animal nutritionists are also concerned that metal salts may bind to phosphates in the feed so that they are less available as a nutrient. The food processing industry has sought alternatives to the use of metal salts for separation of proteins, carbohydrates, fats, and oils from aqueous streams.

While methods have been disclosed for clarification of aqueous streams from food processing plants and separation of biosolids therefrom which do not require metal salts, each of these suffer from disadvantages such as high costs of materials and long reaction times to sufficiently clarify the stream. The present invention provides an economic and efficient process to clarify aqueous streams from food processing and to separate and recover protein in a form capable of subsequent commercial use.

SUMMARY OF THE INVENTION

The present invention provides a process, for example for use in clarification of aqueous streams comprising biosolids, the process comprising contacting an aqueous stream comprising biosolids with an effective amount of:

(1) an anionic inorganic colloid; and (2) an organic polymer, wherein the organic polymer is selected from the group consisting of cationic polymers and amphoteric polymers and mixtures thereof, and has a number average molecular weight of greater than 1,000,000; whereby flocculated biosolids are produced.

The aqueous stream can be contacted with an acid, if desired, to reduce pH of the stream to less than pH 7. In one particular embodiment of this invention, the aqueous stream is contacted simultaneously with the anionic inorganic colloid and an acid to reduce the pH. Subsequent contact of the organic polymer with the stream causes flocculation of the biosolids, such that the flocculated biosolids can be separated from the stream.

Biosolids are typically suspended in aqueous streams due to surface charge effects. Surface charge will depend on pH. The present invention further provides a process which comprises contacting an aqueous stream comprising biosolids, wherein the biosolids possess surface negative charge sites, with an effective amount of:

(a) a first organic polymer, wherein the first organic polymer is a cationic polymer, to reduce the number of surface negative charge sites on the biosolids, so that the biosolids have at least some cationic sites;

(b) an anionic inorganic colloid; and (c) a second organic polymer, wherein the second organic polymer is selected from the group consisting of cationic and amphoteric polymers, and mixtures thereof; to produce flocculated biosolids. Alternatively when the anionic inorganic colloid is a silica-based colloid, the second organic polymer can be selected from the group consisting of cationic, anionic, and amphoteric polymers, and mixtures thereof.

DETAILED DESCRIPTION

Many processing plants generate aqueous streams comprising biosolids such as proteins, carbohydrates, fats, and oils which must be treated to remove the potentially valuable biosolids products and/or before the stream can be discharged from the plant. These aqueous streams are often derived from food processing plants and have solids contents of from about 0.01% to 5% on a weight basis. This invention provides a process for clarification of such streams, whereby the solids are flocculated, and optional separation therefrom of the biosolids, which can be subsequently used for example, in animal feeds.

As defined herein, to flocculate means to separate suspended biosolids, from a stream comprising biosolids wherein the biosolids become aggregated and separate to the top or bottom of the stream in which the biosolids had previously been suspended. Flocculation produces a flocculated material, which, if desired, can be physically separated from the stream. In the present invention, it is desirable to maximize the size of the flocculated material in order to facilitate removal of this material from the stream.

MATERIALS

Aqueous Stream

In the process of this invention, the aqueous stream to be treated can be from any processing plant that produces an aqueous stream comprising biosolids, such as food processing plants. For example, animal slaughterhouses and animal processing plants and other food processing plants may produce aqueous streams comprising protein, fats and oil. Animal slaughterhouses and processing plants include those for cattle, hogs, poultry and seafood. Other food processing plants include plants for vegetable, grain and dairy food processing, for example, plants for processing soybeans, rice, barley, cheese, and whey; plants for wet-milling of starches and grains; as well as breweries, distilleries and wineries. Biosolids present in aqueous streams from these processes may include sugars, starches and other carbohydrates in addition to protein, fats, and oils. For example in processing of soybeans, proteins are extracted into an aqueous stream from which they are subsequently recovered. The present invention is especially useful for treating streams from animal processing, and more particularly, from poultry processing.

While this invention is useful in conventional food processing operations, which produce aqueous suspensions of biosolids, it should be recognized that this invention is also useful in treatment of aqueous suspensions of biosolids derived from processing of food (animal or vegetable) materials, which may have non-food end uses. For example, when separated and recovered, proteins are useful in certain cosmetics and other skin care formulations; starch has numerous non-food uses, including uses in paper manufacture. Further still, this invention is useful to treat in general, any aqueous stream comprising biosolids, which may result from non-food processing operations. Moreover, though the biosolids, as disclosed above, are generally suspended in a substantially aqueous stream, a substantially concentration of quantity of biosolids can also be dissolved in the stream depending on the property of the stream or the biosolids such as, for example, pH, salinity, or other parameters.

Anionic Inorganic Colloid

Anionic inorganic colloids useful in the process of this invention can include silica-based and non-silica-based anionic inorganic colloids and mixtures thereof. Silica-based anionic inorganic colloids include, but are not limited to, colloidal silica, aluminum-modified colloidal silica, polysilicate microgels, polyaluminosilicate microgels, polysilicic acid, and polysilicic acid microgels, and mixtures thereof. Non-silica-based anionic inorganic colloids include clays, especially colloidal bentonite clay. Other non-silica-based anionic inorganic colloids include colloidal tin and titanyl sulfate.

The anionic inorganic colloids used in this invention can be in the form of a colloidal silica sol having an S value in the range of 8 to 45% and containing about 2 to 60% by weight of $SiO_2$, preferably about 4 to 30% by weight of $SiO_2$. The colloid can have particles with at least a surface layer of aluminum silicate or it can be an aluminum modified silica sol. The alumina content of the surface-modified silica sol can be in the range of 2 to 25%. The colloidal silica particles in the sols commonly have a specific surface area of 50–1200 $m^2/g$, more preferably about 200–1000 $m^2/g$, and most preferably a specific surface area of about 300–700 $m^2/g$. The silica sol can be stabilized with alkali in a molar ratio of $SiO_2:M_2O$ of from 10:1 to 300:1, preferably 15:1 to 100:1, and most preferably 6:1 to 12:1 (M is Na, K, Li, or $NH_4$). The colloidal particles have a particle size of less than 60 nm, with an average particle size less than 20 nm, and most preferably with an average particle size of from about 1 nm to 10 nm.

Microgels are distinct from colloidal silica in that the microgel particles usually have surface areas of 1000 $m^2/g$ or higher and the microgels are comprised of small 1–2 nm diameter silica particles linked together into chains and three-dimensional networks. Polysilicate microgels, also known as active silicas, have $SiO_2:Na_2O$ ratios of 4:1 to about 25:1, and are discussed on pages 174–176 and 225–234 of "The Chemistry of Silica" by Ralph K. Iler, published by John Wiley and Sons, N.Y., 1979. Polysilicic acid generally refers to those silicic acids that have been formed and partially polymerized in the pH range 1–4 and comprise silica particles generally smaller than 4 nm diameter, which thereafter polymerize into chains and three-dimensional networks. Polysilicic acid can be prepared in accordance with the methods disclosed in U.S. Pat. Nos. 5,127,994 and 5,626,721, incorporated herein by reference. Polyaluminosilicates are polysilicate or polysilicic acid microgels in which aluminum has been incorporated within the particles, on the surface of the particles, or both. Polysilicate microgels, polyaluminosilicate microgels and polysilicic acid can be prepared and stabilized at acidic pH. Better results have been generally found to occur with larger microgel sizes; generally greater than 10 nm size microgels give the best performance. Microgel size can be increased by any of the known methods such as of aging of the microgel, changing pH, changing concentrations, or other methods, known to those skilled in the art.

The polysilicate microgels and polyaluminosilicate microgels useful in this invention are commonly formed by the activation of an alkali metal silicate under conditions described in U.S. Pat. Nos. 4,954,220 and 4,927,498, incorporated herein by reference. However, other methods can also be employed. For example, polyaluminosilicates can be formed by the acidification of silicate with mineral acids containing dissolved aluminum salts as described in U.S. Pat. No. 5,482,693, incorporated herein by reference. Alumina/silica microgels can be formed by the acidification of silicate with an excess of alum, as described in U.S. Pat. No. 2,234,285, incorporated herein by reference.

In addition to conventional silica sols and silica microgels, silica sols such as those described in European patents EP 491879 and EP 502089, incorporated herein by reference, can also be used for the anionic inorganic colloid in this invention. The anionic inorganic colloids are used in an effective amount, together with a organic polymer to produce flocculated biosolids. An effective amount can range from about 1 to 7500 parts per million (ppm) by weight as solids, e.g., as $SiO_2$, based on the solution weight of the aqueous stream. The preferred range is from about 1 to 5000 ppm, depending on the anionic inorganic colloid. Preferred ranges for selected anionic inorganic colloids are 2 to 500 ppm for polysilicic acid or polysilicate microgels; 4 to 1000 ppm for colloidal silica, and 2 to 2000 ppm for inorganic colloidal clays, such as bentonite.

Organic Polymers

Organic polymers useful in the process of this invention include cationic and amphoteric polymers and mixtures thereof. The organic polymers will typically have a number average molecular weight greater than 1,000,000. These are generally referred to as "high molecular weight polymers".

High molecular weight cationic organic polymers include cationic starch, cationic guar gum, chitosan and high molecular weight synthetic cationic polymers such as cationic polyacrylamide. Cationic starches include those formed by reacting starch with a tertiary or quaternary amine to provide cationic products with a degree of substitution of from 0.01 to 1.0, containing from about 0.01 to 1.0 wt % nitrogen. Suitable starches include potato, corn, waxy maize, wheat, rice and oat. Preferably the high molecular weight cationic organic polymer is polyacrylamide.

The high molecular weight cationic organic polymers are used in an effective amount, together with an anionic inorganic colloid to produce flocculated biosolids. An effective amount of a cationic polymer can range from about 0.2 to 5000 ppm based on the solution weight of the aqueous stream. The preferred range is from about 1 to 2500 ppm.

Amphoteric polymers include amphoteric starch, guar gum and synthetic amphoteric high molecular weight organic polymers. Amphoteric polymers are typically used in the same amounts as the high molecular weight cationic polymers.

The present invention further includes a process which comprises contacting an aqueous stream which comprises biosolids possessing surface negative charge sites, with an effective amount of a first organic polymer to reduce the number of the surface negative charge sites. The first organic polymer is a cationic polymer, which is used to reduce the number of surface negative charge sites and to impart some cationic sites. An effective amount is typically an amount sufficient to neutralize at least 1%, and preferably at least 10% of the surface negative charge sites on the biosolids. Low or high molecular weight cationic organic polymers, or mixtures thereof can be used. Low molecular weight cationic organic polymers are preferred due to their higher cationicity and lower cost of use.

Useful high molecular weight cationic polymers include those described above.

Useful low molecular weight cationic polymers have a number average molecular weight in the range between about 2,000 to about 1,000,000, preferably between 10,000 and 500,000. The low molecular weight polymer can be for example, polyethylene imine, polyamines, polycyandiamide formaldehyde polymers, amphoteric polymers, diallyl dimethyl ammonium chloride polymers, diallylamionoalkyl (meth)acrylate polymers and dialkylaminoalkyl (meth) acrylamide polymers, a copolymer of acrylamide and diallyl dimethyl ammonium chloride, a copolymer of acrylamide and diallylaminoalkyl (meth)acrylates, a copolymer of acrylamide and dialkyldiaminoalkyl (meth)acrylamides, and a polymer of dimethylamine and epichlorohydrin. These have been described in U.S. Pat. Nos. 4,795,531 and 5,126,014.

The first organic polymer, a high or low molecular weight cationic organic polymer, or mixtures thereof, is added in an effective amount to reduce the number of surface negative charge sites on the biosolids. An effective amount is dependent on several factors, including the number of surface negative charge sites present on the biosolids in the aqueous stream, the type of biosolid, and the pH of the aqueous stream. An effective amount can be determined by means available and known to those skilled in the art, using techniques such as colloidal titration. Generally this amount will be in the range of from about 0.01 to about 10,000 ppm of polymer, based on total weight of the stream. The term "ppm" is defined above.

After treatment with the first organic polymer, the aqueous stream is treated with a second organic polymer. The second organic polymer will depend on the anionic inorganic colloid. The second organic polymer can be selected from the group consisting of cationic and amphoteric polymers and mixtures thereof for any anionic inorganic colloid. When the anionic inorganic colloid is a silica-based anionic inorganic colloid, the second organic polymer can be selected from the group consisting of anionic, cationic, amphoteric polymers and mixtures thereof. Cationic and amphoteric polymers are described above and can be high or low molecular weight polymers.

Anionic polymers that can be used in the process of this invention have a number average molecular weight of at least 500,000 and a degree of anionic substitution of at least 1 mol %. Anionic polymers with number average molecular weights of greater than 1,000,000 are preferred. Preferably the degree of anionic substitution is 10–70 mol %.

Examples of useful anionic polymers include water soluble vinylic polymers containing acrylamide, acrylic acid, acrylamido-2-methylpropylsulfonate and/or mixtures thereof, and can also be either hydrolyzed acrylamide polymers or copolymers of acrylamide or a homolog, such as methacrylamide, with acrylic acid or a homolog, such as methacrylic acid, or even with monomers such as maleic acid, itaconic acid, vinyl sulfonic acid, acrylamido-2-methylpropylsulfonate, and other sulfonate containing monomers. Anionic polymers are further described, for example, in U.S. Pat. Nos. 4,643,801; 4,795,531; and 5,126,014.

Other anionic polymers that can be used include anionic starch, anionic guar gum and anionic polyvinyl acetate.

Optional Components

If desired, the pH of the aqueous may be first reduced to less than pH 7 using an acid. Typically, mineral acids such as sulfuric acid, hydrochloric acid and nitric acid are preferred. Other useful acids include, but are not limited to, carbon dioxide, sulfonic acids, and organic acids such as carboxylic acids, acrylic acids and acidic anionic inorganic colloids, partially neutralized acids in which one or more protons are replaced with a metal or ammonium ion, and mixtures thereof. Acidic anionic inorganic colloids include, but are not limited to, low molecular weight polysilicic acid, high molecular weight polysilicic acid microgels, acidic polyaluminosilicates and acid stabilized polysilicate microgels. Examples of acid stabilized polysilicate microgels are described in U.S. Pat. Nos. 5,127,994 and 5,626,721.

Optionally metal salts can be used in the process of this invention. Iron and aluminum are particularly useful. Acid metal salts can be used to reduce pH and act as a charge donor.

PROCESS

The process of this invention involves treatment of an aqueous stream containing biosolids, for example, proteins, to reduce suspended solids (as measured by turbidity) and optionally to separate the biosolids. The biosolids can be recovered for subsequent use. It should be recognized that this process can capture both suspended biosolids as well as soluble materials, such as those present in blood and sugars.

The process of this invention involves treating an aqueous stream comprising biosolids by contacting the stream with an anionic inorganic colloid and an organic polymer. The aqueous stream can be derived from any number of processes, which generate such streams, such as from animal and vegetable processing, including processing for non-food uses. The organic polymer is selected from the group consisting of cationic and amphoteric polymers having a number average molecular weight greater than 1,000,000, and mixtures thereof. Optionally the aqueous stream is contacted with an acid to reduce the pH of the stream to less than pH 7. Further, a metal salt, especially an iron or aluminum salt can be optionally added. These reagents, anionic inorganic colloid, organic polymer and optional acid and/or metal salt, can be contacted with the stream in any sequential order, or one or more can be contacted simultaneously with the aqueous stream. In one particular embodiment, the stream is simultaneously contacted with an acid and the anionic inorganic colloid.

The optional reduction of the pH of the aqueous stream to less than pH 7 can be accomplished with any acid, examples of acids being described above. When an acidic anionic inorganic colloid is used to reduce pH of the stream to less than pH 7, no additional source of acid or anionic inorganic colloid may be needed to flocculate the biosolids in the aqueous stream.

The aqueous stream is contacted with an anionic inorganic colloid and an organic polymer. This may occur prior to, subsequent to, or simultaneously with, reducing pH of the aqueous stream to less than pH 7, should a pH reduction step be desired. The inorganic colloid and the organic polymer can be contacted with the aqueous stream separately, in either order, or simultaneously. The combination of contacting an anionic inorganic colloid and an organic polymer with the aqueous stream produces flocculated biosolids.

The flocculated biosolids can optionally be separated from the treated stream by conventional separation processes such as sedimentation, flotation, filtering, centrifugation, decantation, or combinations of such processes. The separated biosolids can subsequently be recovered and used in numerous applications. It has also been surprisingly found that the recovered biosolids from this process have reduced odor when dry relative to those recovered from a process using ferric chloride as part of a flocculating system.

It is generally believed that suspended biosolids such as proteins in aqueous streams carry surface negative charges. The present invention further provides a process which comprises contacting an aqueous stream comprising biosolids with an effective amount of a first organic polymer to reduce the number of surface negative charge sites on the suspended biosolids in the stream. The first organic polymer is a cationic polymer and is used in an amount sufficient to impart some cationic sites to the biosolids. Typically sufficient cationic polymer is added to neutralize at least 1%, and preferably at least 10% of the surface negative charge sites on the biosolids. The first organic polymer can be a high or low molecular weight cationic organic polymer. Preferably the cationic polymer is a low molecular weight cationic polymer.

An anionic inorganic colloid and a second organic polymer are contacted with the aqueous stream prior to, subsequent to, or simultaneously with the first organic polymer, to produce flocculated biosolids in the stream. The second organic polymer is selected from the group consisting of cationic, amphoteric, and anionic polymers, and mixtures thereof, depending on the anionic inorganic colloid. For any anionic inorganic colloid, the second organic polymer can be selected from the group consisting of cationic and amphoteric polymers and mixtures thereof. For silica-based anionic inorganic colloids, the second organic polymer can be selected from the group consisting of anionic, cationic, amphoteric polymers and mixtures thereof.

The flocculated biosolids can be separated and recovered by known techniques, such as those mentioned above.

EXAMPLES

Example 1

A sample of a wash water containing about 1000 ppm of un-flocculated protein containing biosolids was obtained from an Eastern Shore poultry processing plant. The initial turbidity was >200. The initial pH was about 7.

The following reagents were added in all of the runs to a beaker: high molecular weight cationic polyacrylamide, Percol 182®, available from Ciba Specialty Chemicals, Basel, Switzerland, 8 ppm; silica microgel solution, Particol® MX, 120 ppm ($SiO_2$ basis), available from E. I. dupont de Nemours and Company, Inc., Wilmington, Del. The amounts given were based on the solution weight of the wash water.

The reagents were added as follows.

(1) 250 ml of the wash water was stirred at medium speed on a Fisher Scientific Model #120 MR magnetic stirrer, available from Fisher Scientific, Pittsburgh, Pa. Dilute sodium hydroxide or sulfuric acid was added to adjust to pH shown in Table 1.

(2) Cationic polyacrylamide was added at time=0.

(3) Silica microgel was added at time=1 minute.

(4) At time=2 minutes, stirrer speed was reduced to slow.

(5) At time=4 minutes, the stirrer was stopped and the flocculated solids were allowed to settle to the bottom of the beaker.

(6) At time=10 minutes, turbidity of the wash water was measured using a Hach Ratio Turbidity Meter, available from Hach Company, Loveland, Colo., in NTU, as an indication of water clarification and ability to recover protein.

(7) At time=20 minutes, a second dose of polyacrylamide, 8 ppm, was added and the stirrer turned to medium speed.

(8) At time=21 minutes, the stirrer speed was reduced to slow, and at 23 minutes, the stirrer was stopped.

(9) Turbidity was measured at time=30 minutes.

TABLE 1

| Run | Wash Water pH | Turbidity 10 min. | Turbidity 30 min. |
| --- | --- | --- | --- |
| 1 | 8.0 | 88 | 63 |
| 2 | 6.9 | 79 | 55 |
| 3 | 6.5 | 77 | 42 |
| 4 | 5.5 | 25 | 2 |
| 5 | 4.5 | 30 | 1 |
| 6 | 3.5 | 10 | 2 |

As seen above in Table 1, the turbidity decreased upon addition of the cationic polymer and silica microgel. Best results were observed at lower pH. Turbidity improved with the second addition of polyacrylamide with the best results again occurring at pH less than 7.

Example 2

The poultry processing wash water of Example 1 was used with several different anionic inorganic colloids. The following anionic inorganic colloids were used:

Ludox® SM colloidal silica, 30 wt % silica sol, surface area=300 $m^2/g$.

Ludox® HS-30 colloidal silica, 30 wt % silica sol, surface area=230 $m^2/g$.

Ludox® 130 colloidal silica, 30 wt % silica sol, surface area=130 $m^2/g$.

Ludox ® colloidal silicas are available from E. I. du Pont de Nemours and Company, Wilmington, Del.

BMA-670, low "S" value colloidal silica sol, surface area= 850 $m^2/g$, available from Eka Chemicals AB, Bohus, Sweden.

Colloidal silica sol, 4 nm, surface area=750 m²/g, available from Nalco Chemical Company, Naperville, Ill.

Particol® MX, polysilicate microgel, surface area=1200 m²/g, available from E. I. du Pont de Nemours and Company.

The high molecular weight cationic organic polymer was Percol 182®.

The following procedure was followed for all of the runs:

(1) In a beaker, while stirring at medium speed, 250 ml of the poultry processing wash water of Example 1 was adjusted to pH 4.5 by addition of dilute sulfuric acid.

(2) An anionic inorganic colloid, 40 ppm on an $SiO_2$ basis, based on the solution weight of the wash water, was added to the acidified wash water at time=0.

(3) At time=1 minute, 4 ppm of the high molecular weight cationic organic polymer was added.

(4) At time=2 minutes, the stirrer speed was reduced to its lowest setting.

(5) At time=4 minutes, the magnetic stirrer was turned off.

(6) At time=10 minutes, the turbidity of the wash water above the flocculated solids was measured.

TABLE 2

| Colloid | Turbidity at 10 min. |
| --- | --- |
| Ludox ® SM | 15 |
| Ludox ® HS-30 | 24 |
| Ludox ® 130 | 28 |
| BMA-670 ® | 11 |
| Nalco $SiO_2$ sol | 11 |
| Particol ® MX | 2.5 |

As can be seen from Table 2, different anionic inorganic colloids can be used, all of which are effective to reduce turbidity of the protein containing wash water. The flocculated biosolids settled from the water to the bottom of the beaker.

Examples 3–8

A second poultry processing wash water containing about 1390 ppm of biosolids was used in these examples. The initial turbidity was >200. The following reagents were added to the wash water per the quantities provided below in Tables 3–8: a low molecular weight cationic organic polymer, diallyldimethylammonium chloride polymer (polydadmac); anionic inorganic colloids: Nalco colloidal silica sol, Particol® polysilicate microgel, and bentonite clay; and; a high molecular weight cationic organic polymer, Percol 182®, polyacrylamide (PAM). Amounts of reagents added are provided in Tables 3–8, all amounts are in ppm, based on the solution weight of the wash water.

Example 3 (Comparative)

250 ml of the wash water was stirred at medium speed. Polydadmac was added at time=0. At time=10 seconds, an anionic inorganic colloid was added. After 15 seconds, mixing was stopped and the wash water was transferred to an air flotation set up comprising a 300 ml tall form beaker equipped with a fritted glass sparger (30 mm diameter medium porosity) centered in the beaker. Approximately 50 ml per minute of air at 1 psi was sparged into the wash water until time=4 minutes, when the air sparging was stopped. Turbidity was recorded at 5 and 10 minutes.

TABLE 3

| | | Colloid | | Turbidity | |
| --- | --- | --- | --- | --- | --- |
| Run | Polydadmac ppm | Nalco sol $SiO_2$, ppm | Particol ® MX $SiO_2$, ppm | 5 min. | 10 min. |
| 1 | 10 | 20 | | >200 | >200 |
| 2 | 10 | 40 | | >200 | >200 |
| 3 | 10 | | 20 | >200 | >200 |
| 4 | 10 | | 40 | >200 | 129 |
| 5 | 16 | 20 | | >200 | >200 |
| 6 | 16 | 40 | | >200 | >200 |
| 7 | 16 | | 20 | >200 | >200 |
| 8 | 16 | | 40 | >200 | 112 |

As can be seen from Table 3, the combination of a low molecular weight cationic organic polymer and an anionic inorganic colloid is insufficient to reduce turbidity to provide a clarified wash water. In Runs 1, 2, 5 and 6 no floc was formed. In Runs 3, 4, 7 and 8 a small dispersed floc was formed, which contained protein solids, but the floc could not be separated from the wash water.

Example 4

The same process as in Example 3 was followed except with the added step of adding a high molecular weight cationic organic polymer, polyacrylamide, 10 seconds after the addition of the anionic inorganic colloid. Mixing was stopped 15 seconds after the addition of the polyacrylamide. Table 4 provides the quantities of reagents added and results.

TABLE 4

| | Poly- | Colloid | | | Turbidity | |
| --- | --- | --- | --- | --- | --- | --- |
| Run | dadmac ppm | Nalco sol ppm, $SiO_2$ | Particol ® MX ppm, $SiO_2$ | PAM ppm | 5 min. | 10 min. |
| 9 | 10 | 20 | | 6 | >200 | 66 |
| 10 | 10 | 40 | | 6 | >200 | 57 |
| 11 | 10 | | 20 | 6 | 65 | 32 |
| 12 | 10 | | 40 | 6 | 38 | 19 |
| 13 | 16 | 20 | | 6 | >200 | >200 |
| 14 | 16 | 40 | | 6 | 185 | 82 |
| 15 | 16 | | 20 | 6 | 120 | 44 |
| 16 | 16 | | 40 | 6 | 15 | 12 |

As can be seen from Table 4, addition of a high molecular weight cationic polymer to the combination of a low molecular weight cationic polymer and an anionic inorganic colloid enhances wash water clarification by reducing turbidity. In Runs 9, 10, 11, 12, 15 and 16 voluminous flocks were formed which separated to the top and/or bottom of the wash water. These flocs could be recovered. In Run 13, at the higher loading of the cationic polydadmac, the amount of added anionic inorganic colloid is not effective to neutralize a sufficient amount of the negative charge sites present on the solids and significant solids remained in suspension, hence the high turbidity value.

Example 5 (Comparative)

The process of Example 3 was repeated with use of bentonite clay as the anion inorganic colloid. Table 5 provides the quantities of reagents added and results.

TABLE 5

| Run | Polydadmac ppm | Bentonite ppm, SiO$_2$ | Turbidity 5 min. | 10 min. |
|---|---|---|---|---|
| 17 | 10 | 100 | >200 | >200 |
| 18 | 10 | 200 | >200 | >200 |
| 19 | 16 | 100 | >200 | >200 |
| 20 | 16 | 200 | >200 | >200 |

As can be seen from Table 5, the combination of a low molecular weight cationic organic polymer and bentonite as the anionic inorganic colloid is insufficient to reduce turbidity to provide a clarified wash water. Very fine dispersed flocs were formed which could not be separated from the wash water.

Example 6

The process of Example 5 was repeated using bentonite clay as the anionic inorganic colloid. Table 6 provides the quantities of reagents added and results.

TABLE 6

| Run | Polydadmac ppm | Bentonite ppm, SiO$_2$ | PAM ppm | Turbidity 5 min. | 10 min. |
|---|---|---|---|---|---|
| 21 | 10 | 100 | 6 | >200 | 147 |
| 22 | 10 | 200 | 6 | 84 | 46 |
| 23 | 16 | 100 | 6 | >200 | >200 |
| 24 | 16 | 200 | 6 | 158 | 77 |

As can be seen from Table 6, addition of a high molecular weight cationic polymer to the combination of a low molecular weight cationic polymer and bentonite as the anionic inorganic colloid enhances wash water clarification by reducing turbidity. In Runs 21 and 23 fine dispersed flocs were formed, in which there was not an effective amount of bentonite added to neutralize a sufficient number of the cationic charge sites present. In these runs, the solids did not separate very well. In Runs 22 and 24 voluminous flocs were formed which separates to the top and bottom from the wash water.

Example 7

250 ml of the wash water was stirred at medium speed. Dilute sulfuric acid was added to reduce to pH 3.5. At time=0, an anionic inorganic colloid was added. At time=10 seconds, a high molecular weight cationic polyacrylamide was added. After 15 seconds, mixing was stopped and the wash water was transferred to the air flotation set up described in Comparative Example 3. Air was sparged into the wash water at a rate of 50 ml per minute of air at 1 psi until time=4 minutes, when the air sparging was stopped. Turbidity was recorded at 5 and 10 minutes.

TABLE 7

| Run | Colloid, ppm, SiO$_2$ Nalco sol | Particol ® MX | Bentonite | PAM ppm | Turbidity 5 min. | 10 min. |
|---|---|---|---|---|---|---|
| 25 | 20 | | | 6 | 163 | 151 |
| 26 | 40 | | | 6 | 136 | 125 |
| 27 | | 20 | | 6 | 29 | 17 |
| 28 | | 40 | | 6 | 12 | 10 |

TABLE 7-continued

| Run | Colloid, ppm, SiO$_2$ Nalco sol | Particol ® MX | Bentonite | PAM ppm | Turbidity 5 min. | 10 min. |
|---|---|---|---|---|---|---|
| 29 | | | 100 | 6 | >200 | 131 |
| 30 | | | 200 | 6 | 90 | 38 |

As can be seen from Table 7, by lowering the pH of the wash water followed by addition of both an anionic inorganic colloid and a high molecular weight cationic organic polymer, turbidity is reduced. In all of the runs, fine to large to compact flocs containing solid proteins were formed which separated to the top and/or bottom of the wash water. The protein-containing flocs could be recovered.

Example 8

250 ml of a poultry processing wash water was stirred at medium speed. Dilute sulfuric acid was added to reduce to pH 3.5. At time=0, Particol® MX polysilicate microgel was added. At time=20 seconds, a high molecular weight cationic polyacrylamide (PAM) was added. At time=30 seconds, mixing was stopped and the wash water was transferred to the air flotation set up described in Comparative Example 3. Air was sparged into the wash water at a rate of 100 ml per minute of air at 1 psi until time=4 minutes, when the air sparging was stopped. Turbidity was recorded at 5 and 10 minutes. The liquid was then drained from the air flotation set up through a screen at time=12 minutes and turbidity of the drained liquid was measured. The protein containing solids were collected on the screen.

TABLE 8

| Run | Particol ® MX ppm, SiO$_2$ | PAM ppm | Turbidity 5 min. | 10 min. | Drained liquid |
|---|---|---|---|---|---|
| 31 | 20 | 6 | 51 | 30 | 28 |
| 32 | 40 | 6 | 14 | 10 | 13 |

As can be seen from Table 8, the turbidity of the wash water was reduced over time. Further, this example demonstrates separation of the solids from the wash liquid as the solids were collected on the screen. The turbidity of the drained liquid showed little change from the value at 10 minutes, indicating that the solids were retained on the screen and did not become redispersed in the process and pass through.

Example 9

Another sample of a wash water containing about 1000 ppm of unflocculated biosolids was obtained from an Eastern Shore poultry processing plant, having a turbidity of over 200.

Polysilicate microgel solution, Particol® MX, was stabilized with sulfuric acid. The microgel solution was aged for various periods of time before use, the aging times provided in Table 9.

250 ml of the wash water was stirred at medium speed. At time=0, high molecular weight polyacrylamide, Percol 182®, 8 ppm, based on the solution weight of the wash water, was added. At time=1 minute, the acid stabilized aged polysilicate microgel solution was added, 120 ppm, based on the solution weight of the wash water. Runs were made for each aging time. At time=2 minutes, the stirring speed was reduced to slow. At time=5 minutes, the stirring was stopped. At time=15 minutes, turbidity of the wash water was measured.

TABLE 9

| Aging Time | Turbidity |
| --- | --- |
| 15 seconds | 122 |
| 5 minutes | 39 |
| 15 minutes | 21 |
| 45 minutes | 5 |

As can be seen from the results in Table 9, the combination of an acid stabilized polysilicate microgel and cationic polyacrylamide was sufficient to reduce turbidity of the wash water without the need to first reduce pH to less than 7. In addition, the results show that longer aging times of the polysilicate microgel provided further improvements in reducing turbidity. In another experiment with similarly aged microgel solution, the average size of the microgel increased from 5 nm at 15 seconds aging time to 230 nm at 45 minutes aging time.

Example 10

250 ml of soybean whey solution from Protein Technologies, Inc. containing 0.51% protein was stirred at medium speed. Dilute sulfuric acid was added to adjust to pH 2.5. 160 ppm, based on the solution weight of the soybean solution, of BMA-9 colloidal silica, available from Eka Chemicals AB, Bohus, Sweden, was added at time=0 and mixed for 10 minutes at medium speed. 8 ppm, based on the solution weight of the soybean solution, of high molecular weight polyacrylamide, Percol 182®, was then added and mixed for 10 minutes. The mixture was filtered using glass filter paper 934 AH, available from Whatman, Clifton, N.J. 0.11 grams of solid protein were recovered. The filtered solution contained 0.416% protein, representing a 20% reduction in protein content.

Example 11

An aqueous waste stream from an Eastern Shore poultry processing plant was treated on-stream in accordance with this invention in a continuous process. To the waste stream was added simultaneously, sufficient sulfuric acid to reduce the pH of the stream to 3.7 and Particol® MX, polysilicate microgel, 95 ppm $SiO_2$, based on the solution weight of the stream. Downstream (about 30 seconds) from the point of addition of the acid and the microgel was added cationic polyacrylamide, Percol 182®, 4 ppm, based on the solution weight of the stream. The stream was directed to a dissolved air flotation (DAF) unit, where the solids were floated to the surface and skimmed off for recovery. The remaining aqueous stream was tested for chemical (COD) and biological oxygen demand (BOD) and total suspended solids (TSS).

COD was determined using a Hach COD Test Kit, available from the Hach Company, Loveland, Col. TSS was determined by Method 2450 D from "Standard Methods for Examination of Water and Wastewater", published jointly by the American Public Health Association, American Water Works Association and Water Environment Federation. BOD was determined by Method 5210 from "Standard Methods for Examination of Water and Wastewater".

TABLE 10

| Treatment | COD, mg/l | BOD, mg/l | TSS, mg/l |
| --- | --- | --- | --- |
| None | 2970 | 1393 | N/T* |
| Example 11 | 180 | 180 | 67 |

*N/T = not tested. But typically this number is about 1000 mg/l prior to treatment.

As can be seen from Table 10, the process of this invention reduces chemical and biological oxygen demand of the waste stream in a continuous flow process of an actual poultry processing plant.

Example 12

A slurry of 20 grams of Staley Pearl Starch, unmodified corn starch in 980 grams of water was stirred at medium speed. 10 ppm $SiO_2$, as Particol® MX, acid stabilized polysilicate microgel solution, based on the weight of the starch slurry, was added at time=0 and mixed for 15 seconds. High molecular weight polyacrylamide, Percol 182®, 2 ppm, based on the solution weight of the starch slurry, was then added at time=15 seconds and mixed for 30 seconds. Mixing was then stopped. Turbidity measured after 30 seconds of standing, at time=45 seconds, was 46. The test was repeated, the only difference being 20 ppm of $SiO_2$, as Particol) MX, was used. Turbidity at 45 seconds was 29. In a third comparative test, the Particol® MX was not added. Turbidity was 186.

Example 13

A sample of wastewater was obtained from an Eastern Shore poultry processing plant. The wastewater had a COD of >2100 ppm, an initial turbidity of >200, and a pH of 6.1. Into a 400 ml beaker was placed 250 ml of the wastewater. The wastewater was stirred using a mechanical propeller type stirrer at 275 rpm. The pH of the wastewater was adjusted using dilute $H_2SO_4$ to pH 5.5. At time=0, Particol® MX, silica microgel, was added. At time=15 seconds, cationic polymer, polyacrylamide (PAM), Percol® 182 was added. At time=25 seconds, or 10 seconds after the polymer was added, the mixer speed was reduced to 150 rpm. Mixing was stopped 40 seconds after the addition of the polymer. The wastewater was sampled for turbidity measurements at 35 and 95 seconds after mixing was stopped. The pH was measured after the 95 second turbidity measurement. The flocculated wastewater was then resuspended by mixing for 30 seconds at 150 rpm. After 1 minute, the agitation was discontinued the wastewater was sampled for COD measurements.

COD was determined using 0–1500 ppm COD calorimetric analysis ampules from CHEMetrics, Calverton, Va. and a Milton Roy Spectronic model 20 spectrophotometer set at 620 nm wavelength. Table 11 provides the quantities of reagents added and results for these runs, which are 33 and 34.

Example 14

The process of Example 13 was repeated using the same wastewater sample. However, instead of adding acid, 32 ppm of $FeCl_3$ was added 15 seconds prior to addition of the Particol® MX. All times from Example 13 are shifted by adding 15 seconds. Quantities of reagents added and results are provided as Run 35 in Table 11.

TABLE 11

| Run | Particol ® MX, ppm, SiO$_2$ | Cationic PAM, ppm | Turbidity 35 sec | Turbidity 95 sec | Final pH | COD, ppm |
|---|---|---|---|---|---|---|
| 33 | 120 | 12 | 33 | 32 | 5.68 | 475 |
| 34 | 80 | 12 | 10 | 9 | 5.63 | 386 |
| 35 | 120 | 12 | 16 | 14 | 5.61 | 415 |

As can be seen from Table 11, the combined use of acid or ferric chloride, silica microgel, and cationic polyacrylamide are effective to reduce turbidity, and chemical oxygen demand in a wastewater stream containing biosolids.

Example 15

The process of Example 13 was repeated using the same wastewater sample. However, there was no step to reduce pH and the organic polymer was varied. At time=0, Particol® MX was added. At time=15 seconds, low molecular weight cationic polymer, polyamine, Agelfloc® A50HV, available from Ciba Specialty Chemicals, was added. At time=30 seconds, a second organic polymer was added, either cationic polyacrylamide (PAM), Percol® 182 or anionic polyacrylamide (PAM), Percol® 155 PG, also available from Ciba Specialty Chemicals, was added. At time=40 seconds, or 10 seconds after the polymer was added, the mixer speed was reduced to 150 rpm. Mixing was stopped 40 seconds after the addition of the polymer. The wastewater was sampled for turbidity measurements at 35 and 95 seconds after mixing was stopped. The pH was measured after the 95 second turbidity measurement. The flocculated wastewater was then re-suspended by mixing for 30 seconds at 150 rpm. After 1 minute, the agitation was discontinued the wastewater was sampled for COD measurements. Table 12 provides the quantities of reagents added and results.

TABLE 12

| Run | Particol ® MX, ppm, SiO$_2$ | Polyamine, ppm | Cationic PAM, ppm | Anionic PAM, ppm | Turbidity 35 sec | Turbidity 95 sec | Final pH | COD, ppm |
|---|---|---|---|---|---|---|---|---|
| 36 | 50 | 40 | 12 |  | 185 | 84 | 6.03 | 444 |
| 37 | 50 | 40 |  | 12 | 33 | 28 | 5.98 | 429 |
| 38 | 100 | 40 | 12 |  | 5 | 4 | 5.99 | 415 |
| 39 | 100 | 40 |  | 12 | 6 | 3 | 5.99 | 540 |

As can be seen from Table 12, different organic polymers and in different combinations can be used with an anionic colloid to clarify wastewater and reduce chemical oxygen demand. In Runs 36 and 38, a low molecular weight cationic polyamine is used in combination with a high molecular weight polyacrylamide. In Runs 37 and 39, the polyamine is used in combination with an anionic polyacrylamide.

Example 16

The process of Example 13 was repeated with the difference of adding base, sodium hydroxide to increase pH to 6.5 prior to the addition of the Particol® MX. The remaining steps were performed without change. Table 13 provides the quantities of reagents added and results.

TABLE 13

| Run | Particol ® MX, ppm, SiO$_2$ | Cationic PAM, ppm | Turbidity 35 sec | Turbidity 95 sec | Final pH | COD, ppm |
|---|---|---|---|---|---|---|
| 40 | 80 | 12 | 55 | 55 | 6.42 | 766 |
| 41 | 40 | 12 | 34 | 34 | 6.51 | 628 |

As can be seen from Table 13, clarification of the wastewater stream and reduction of its chemical oxygen demand can be achieved at pH close to 7, with use of an anionic colloid and cationic polymer.

What is claimed is:

1. A process comprising contacting a substantially aqueous stream comprising biosolids with an effective amount of:
   (a) an anionic inorganic colloid selected from the group consisting of polysilicate microgels, polyaluminosilicate microgels, and polysilicic acid microgels, and mixtures thereof; and
   (b) a cationic polyacrylamide having a number average molecular weight greater than 1,000,000;
   to produce flocculated biosolids.

2. A process comprising contacting an aqueous stream, which comprises biosolids possessing surface negative charge sites, with:
   (a) an effective amount of a first organic polymer, which is a cationic polymer, to reduce the number of surface negative charge sites on the biosolids so that the biosolids have at least some cationic sites;
   (b) an effective amount of an anionic inorganic colloid selected from the group consisting of polysilicate microgels, polyaluminosilicate microgels, and polysilicic acid microgels, and mixtures thereof; and
   (c) an effective amount of a cationic polyacrylamide having a number average molecular weight greater than 1,000,000;
   to produce flocculated biosolids.

3. The process of claim 1 or 2 wherein the anionic inorganic colloid is in an amount of 1 to 7500 ppm based on the solution weight of the aqueous stream and the polyacrylamide is used in an amount of 0.2 to 5000 ppm, based on the solution weight of the aqueous stream.

4. The process of claim 1 or 2 wherein the anionic inorganic colloid has a microgel size of greater than 10 nm in diameter.

5. The process of claim 2 wherein the first organic polymer is a low molecular weight cationic polymer having a number average molecular weight in the range of 2,000 to 1,000,000.

6. The process of claim 2 wherein the first organic polymer is a high molecular weight cationic polymer having a number average molecular weight greater than 1,000,000.

7. The process of claim 1, 2, 5, or 6 further comprising separating and recovering the flocculated biosolids.

* * * * *